United States Patent [19]

Yokogawa

[11] Patent Number: 5,132,901
[45] Date of Patent: Jul. 21, 1992

[54] SYSTEM AND METHOD FOR INPUT OF TARGET LANGUAGE EQUIVALENTS AND DETERMINATION OF ATTRIBUTE DATA ASSOCIATED THEREWITH

[75] Inventor: Toshihiko Yokogawa, Yokohama, Japan

[73] Assignee: Ricoh Company, Ltd., Japan

[21] Appl. No.: 498,737

[22] Filed: Mar. 26, 1990

[30] Foreign Application Priority Data

Mar. 29, 1989 [JP] Japan .................. 1-77340

[51] Int. Cl.$^5$ .................................................. G06F 00/00
[52] U.S. Cl. .................................................. 364/419
[58] Field of Search .................. 364/419, 200, 900

[56] References Cited

U.S. PATENT DOCUMENTS

| 4,831,529 | 5/1989 | Miike et al. | 364/419 |
| 4,860,206 | 8/1989 | Kugimiya et al. | 364/419 |
| 4,954,984 | 9/1990 | Kaijima et al. | 364/419 |
| 4,964,044 | 10/1990 | Kumano et al. | 364/419 |

FOREIGN PATENT DOCUMENTS

| 2575309 | 6/1986 | France . |
| 0059278 | 4/1982 | Japan . |
| 0134775 | 8/1982 | Japan . |
| 0137965 | 8/1982 | Japan . |
| 0193073 | 10/1985 | Japan . |

*Primary Examiner*—Gail O. Hayes
*Attorney, Agent, or Firm*—Mason, Fenwick & Lawrence

[57] ABSTRACT

An apparatus for editing a dictionary for use in translation includes an object language dictionary storing words in an object language and attribute information on the words. An analyzer analyzes a desired equivalent by referring to the words in the object language and attribute information on the words stored in the object language dictionary and determines attribute information on the desired equivalent. A register part registers the desired equivalent and the attribute information on the desired equivalent supplied from the analyzer in a translation dictionary. A method for editing a dictionary for use in translation is also provided.

20 Claims, 13 Drawing Sheets

FIG. 8

| ENGLISH ENTRY | ENGLISH ATTRIBUTE INFORMATION | | JAPANESE EQUIVALENT | EQUIVALENT ATTRIBUTE INFORMATION | | |
|---|---|---|---|---|---|---|
| | PART OF SPEECH | --- | | PART OF SPEECH | DECLENSION | MEANING/FEATURE |
| --- | --- | --- | --- | --- | --- | --- |
| WHITE HOUSE | N | --- | HOWAITOHAUSE | NOUN | NOT-DICLINABLE | --- |
| --- | --- | --- | --- | --- | --- | --- |

FIG. 9

| JAPANESE ENTRY | ATTRIBUTE INFORMATION ||| |
|---|---|---|---|
| | PART OF SPEECH | DECLENSION | MEANING/FEATURE |
| AMERICAGASSHUKOKU | PROPER NOUN | NOT-DECLINABLE | NAME OF PLACE · PLACE |
| NO | POST POSITIONAL WORD | NOT-DECLINABLE | PARTICIPICLE MODIFICATION |
| DAITORYO | NOUN | NOT-DECLINABLE | MAN |
| NO | POST POSITIONAL WORD | NOT-DECLINABLE | PARTICIPLE MODIFICATION |
| YAKATA | NOUN | NOT-DECLINABLE | BUILDING · PLACE |
| --- | --- | --- | --- |

FIG. 10

| ENGLISH ENTRY | ENGLISH ATTRIBUTE INFORMATION | | JAPANESE EQUIVALENT | EQUIVALENT ATTRIBUTE INFORMATION | | |
|---|---|---|---|---|---|---|
| | PART OF SPEECH | ... | | PART OF SPEECH | DECLENSION | MEANING/ FEATURE |
| WHITE HOUSE | NOUN N | ... | AMERICAGASSHUKOKU NO DAITORYO NO YAKATA | NOUN | NOT-DECLINABLE | BUILDING PLACE |

FIG. 11

| ENGLISH ENTRY | ENGLISH ATTRIBUTE INFORMATION | | JAPANESE EQUIVALENT | EQUIVALENT ATTRIBUTE INFORMATION | | |
|---|---|---|---|---|---|---|
| | PART OF SPEECH | ... | | PART OF SPEECH | DECLENSION | MEANING/ FEATURE |
| WHITE HOUSE | NOUN N | ... | AMERICAGASSHUKOKU NO DAITORYO NO YAKATA | NOUN | NOT-DECLINABLE | BUILDING PLACE |
| | | | HOWAITOHAUSU | | NOT DECLINABLE | ... |

FIG. 12

| ENTRY | ATTRIBUTE INFORMATION ||||
|---|---|---|---|---|
| | PART OF SPEECH | DECLENSION | TYPE OF WORD | MEANING |
| HOUSE | NOUN | PLURAL: HOUSES | COUNTABLE NOUN | BUILDING PLACE |
| OF | PREPOSITION | — | PREP 1 | — |
| PRESIDENT | NOUN | PLURAL: PRESIDENTS | COUNTABLE NOUN | MAN |
| THE | DEFINITIVE ARTICLE | — | DET | DEFINITIVE |
| ⋯ | ⋯ | ⋯ | ⋯ | ⋯ |

FIG. 13

| JAPANESE ENTRY | ATTRIBUTE INFORMATION | ENGLISH EQUIVALENT | ATTRIBUTE INFORMATION ||||||
|---|---|---|---|---|---|---|---|
| | | | PART OF SPEECH | DECLENSION | TYPE OF WORD | MEANING/FEATURE | ADDITIONAL INFORMATION |
| | | | | | | | ... |
| DAITORYOFU | --- | THE HOUSE OF THE PRESIDENT | NOUN | PLURAL: THE HOUSE OF THE PRESIDENT | COUNTABLE NOUN | BUILDING PLACE | DEFINITE ARTICLE ADDED |
| --- | --- | | | | | | |

SYSTEM AND METHOD FOR INPUT OF TARGET LANGUAGE EQUIVALENTS AND DETERMINATION OF ATTRIBUTE DATA ASSOCIATED THEREWITH

BACKGROUND OF THE INVENTION

The present invention generally relates to an apparatus and method for editing a dictionary for use in translation in a mechanical translation system.

A mechanical translation system has been proposed in Japanese Laid-Open Patent Application Nos. 63-136265 and 61-90271, for example. Japanese Laid-Open Patent Application No. 63-136265 is directed to registering a new equivalent in an object language, which is added to or substituted for an equivalent registered in the system. Japanese document 63-136265 discloses a system which is composed of specifying means for specifying a desired source word in an input sentence, output means for reading out a registered equivalent of the source word from a dictionary, input means for inputting a new equivalent, means for adding or substituting the new equivalent to or for the registered equivalent, and means for primarily using the new equivalent when translating.

Japanese Laid-Open Patent Application No. 61-90271 discloses a mechanical translation system in which a word to be translated in a sentence is specified and the contents of a dictionary corresponding to the specified word are displayed. When a desired equivalent in an object language is not included in a displayed equivalent, a desired equivalent is registered by the user. Further, a dictionary editing apparatus for use in translation has been proposed. For example, an equivalent in an object language is disassembled into an independent part and an adjunct part. The adjunct part is recorded as information about attributes of the equivalent. The independent word is processed as a corresponding equivalent.

However, the above-mentioned apparatuses are primarily oriented to declinable words (words corresponding to verb phrases). That is, a word is analyzed so that declinable information on tense, aspect, mode and structure of declinable words is automatically obtained. From this point of view, the above-mentioned apparatuses are not effective for processing of noun phrases. Particularly, there is a need to specify a portion of a noun phrase which corresponds to a main noun and inputting information on morphology, grammatical construction and meanings of the main noun.

There is a need to register a new equivalent of a word in a mechanical translation apparatus in which a word A in an original language is automatically translated into an equivalent B in an object language. When registering a new equivalent, it is necessary to register a part of speech, declension and meanings thereof together. Thus, the registering operation is troublesome.

For example, according to Japanese Laid-Open Patent Application No. 63-136265, a word in an original language is specified by the user, and an equivalent is input. It is very difficult to derive an equivalent of the word to be translated from the registered word itself since information about a part of speech or declension is lacking in the registered word itself. Thus, it is very difficult to obtain, from the registered equivalent itself, a correct order of words or correct connections of words. For these reasons, it is necessary for the user to register information about a part of speech and declension needed for translation, and information on the meanings if necessary. Such a registering procedure needs specific knowledge and thus it is extremely difficult for the general user to manually carry out a registering operation.

The above-mentioned discussion holds true for the system disclosed in Japanese Laid-Open Patent Application No. 61-90271. Specific knowledge is needed to register a new word and its equivalent together with attribute information thereon. Thus, the procedure for adding a new equivalent or revising the existing equivalent in the dictionary is very troublesome.

The aforementioned conventional dictionary editing apparatus for use in translation can reduce the word load for a user during registering of an equivalent in an object language. However, it is impossible to process a word such as a noun phrase having no adjunct part and process attributes of composite nouns, particularly information on their meanings.

SUMMARY OF THE INVENTION

It is a general object of the present invention to provide an improved dictionary editing apparatus and method for use in translation in which the aforementioned disadvantages are eliminated.

A more specific object of the present invention is to provide a dictionary editing apparatus and method having a function of automatically determining attribute information about an equivalent, such as a part of speech, declension and meanings so that a more efficient dictionary editing apparatus and method is provided.

The above-mentioned objects of the present invention are achieved by an apparatus for editing a dictionary for use in translation, comprising a translation dictionary having words and phrases in an original language and having equivalents in an object language for the words and phrase in the original language and attribute information on the equivalents;

first retrieving means, coupled to the translation dictionary, for retrieving one of the words and phrases in the translation dictionary and for outputting data related to the one of the words and phrases in the original language;

input means, for inputting data including a desired equivalent in the object language to be added to or substituted for a corresponding one of the words and phrases in the translation dictionary;

an object language dictionary storing words in the object language and attribute information on the words;

analyzing means, coupled to the input means and the object language dictionary, for analyzing the desired equivalent supplied from the input means by referring to the words in the object language and the attribute information on the words stored in the object language dictionary and for presuming attribute information on the desired equivalent; and registering means, coupled to the translation dictionary and the analyzing means, for registering the desired equivalent and the attribute information on the desired equivalent supplied from the analyzing means in the translation dictionary.

The aforementioned objects of the present invention are also achieved by a method for editing a translation dictionary for use in translation, the translation dictionary having words and phrases in an original language and having equivalents in an object language for the words and phrase in the original language and attribute information on the equivalents, comprising the steps of:

(a) retrieving one of the words and phrases in the translation dictionary and outputting data related to the one of the words and phrases in the original language;

(b) inputting data including a desired equivalent in the object language to be added to or substituted for a corresponding one of the words and phrases in the translation dictionary;

(c) analyzing the desired equivalent by referring to words in the object language and attribute information on the words stored in an object language dictionary and presuming attribute information on the desired equivalent; and (d) registering the desired equivalent and the attribute information on the desired equivalent in the translation dictionary.

Further objects, features and advantages of the present invention will become apparent from the following detailed description when read in conjunction with the accompanying drawings.

BRIEF DESCRIPTION OF THE DRAWINGS

FIG. 8 is a diagram illustrating the contents of an English-Japanese translation dictionary shown in FIG. 3;

FIG. 9 is a diagram illustrating the contents of a Japanese analyzing dictionary shown in FIG. 3;

FIG. 10 is a diagram illustrating the contents of the English-Japanese translation dictionary shown in FIG. 3 after an equivalent is changed;

FIG. 11 is a diagram illustrating the contents of the English-Japanese dictionary shown in FIG. 3 after an equivalent is added;

FIG. 12 is a diagram illustrating the contents of an English translation dictionary shown in FIG. 5;

FIG. 13 is a diagram illustrating the contents of a Japanese-English translation dictionary shown in FIG. 5.

DESCRIPTION OF THE PREFERRED EMBODIMENTS

Figure 1:
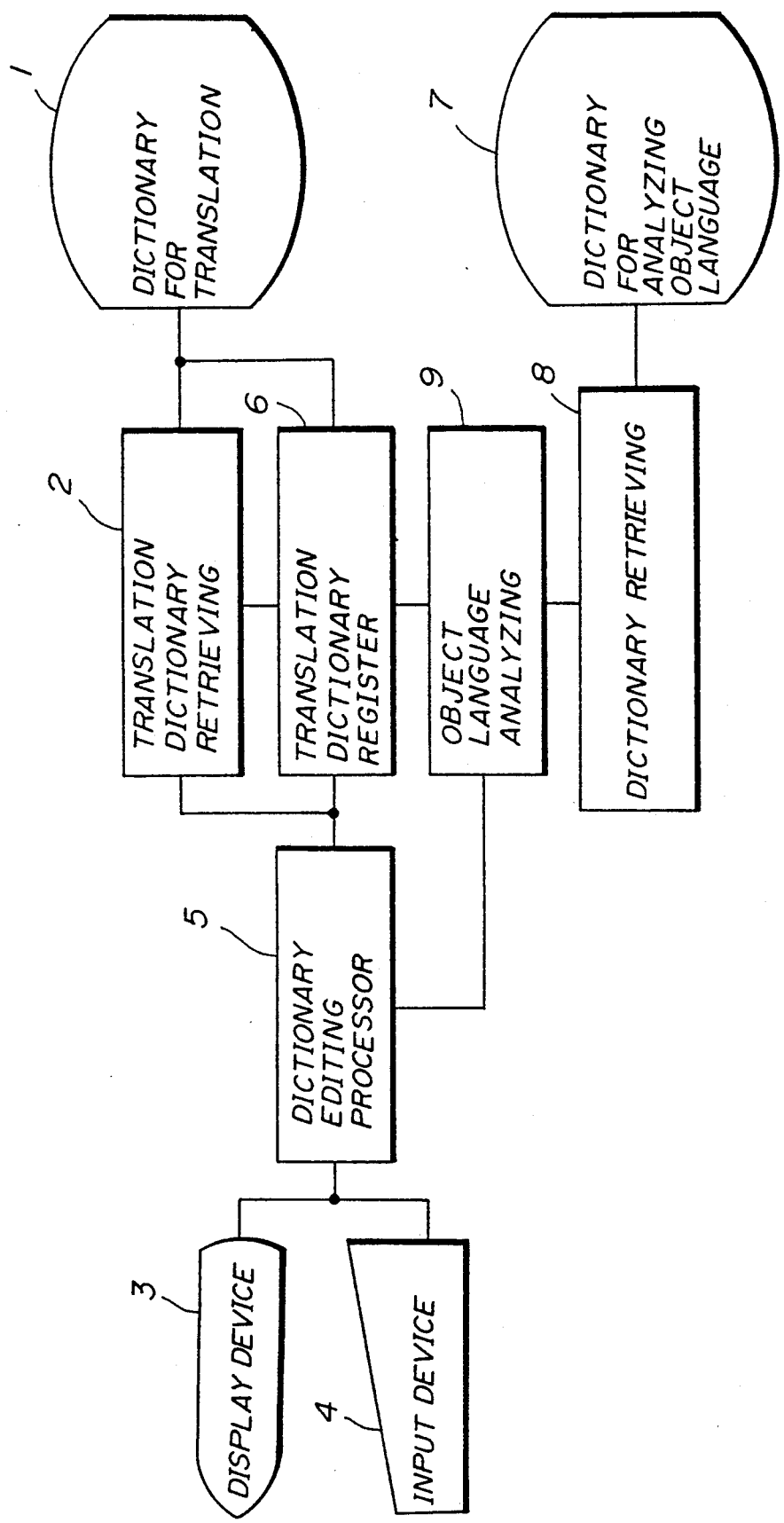
FIG. 1 is a block diagram of a dictionary editing apparatus according to a first preferred embodiment of the present invention.

A description will be given of a dictionary editing apparatus according to a first preferred embodiment of the present invention with reference to FIG. 1. Referring to FIG. 1, the dictionary editing apparatus is composed of a translation dictionary 1 for use in translation, a translation dictionary retrieving block 2, a display device 3, an input device 4, a dictionary editing processor 5, a translation dictionary registering block 6, an object language analyzing dictionary 7, an object language dictionary retrieving block 8, and an object language analyzer 9 for analyzing an object language.

The translation dictionary 1 for use in translation stores words or phrases in an original language (Japanese for example), attribute information thereon, equivalents thereof in an object language (English for example) for the words or phrases, and attribute information about the equivalents. The translation dictionary 1 is searched by the translation dictionary retrieving block 2 and the results of the search are displayed on the display device 3. The original language and object language are input to the apparatus by the input device 4. The translation dictionary editor 5 modifies and adds equivalents and attribute information thereon, which are registered in the translation dictionary 1. The object language analyzing dictionary 7 has words in the object language and attribute information thereof, and is searched by the object language dictionary retrieving block 8. In accordance with the results of the search, an equivalent in the object language is analyzed by the object language analyzer 9 so that attribute information about the equivalent is determined.

Figure 2:
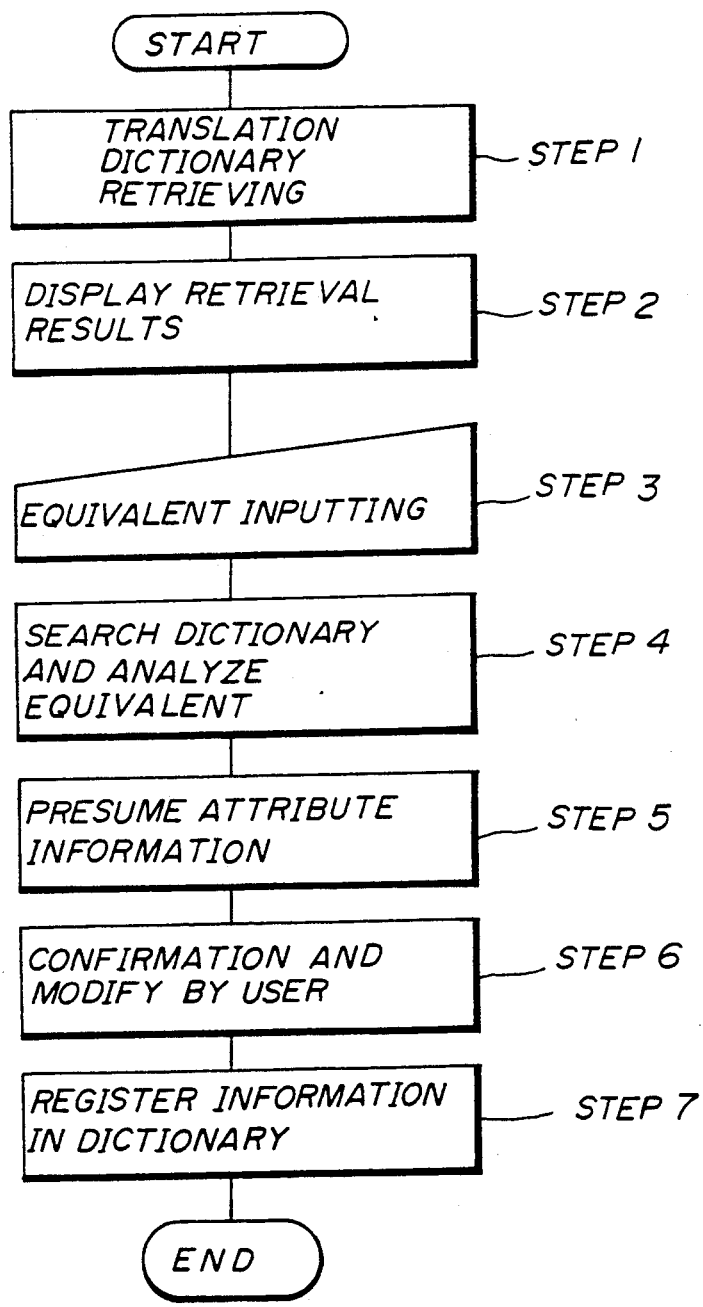
FIG. 2 is a flowchart showing the operation of the dictionary editing apparatus shown in FIG. 1.

FIG. 2 is a flowchart illustrating the operation of the apparatus shown in FIG. 1. At step 1, a word or phrase in the original language is input to the apparatus through the input device 4 so that the dictionary editing processor 5 is made active. The dictionary editing processor 5 instructs the translation dictionary retrieving block 2 to retrieve the input word or phrase. At step 2, the dictionary editing processor 5 controls the display device 3 so that the results of the search including an equivalent of the input word or phrase and attribute information thereon are displayed. At step 3, the operator operates the input device 4 and inputs an equivalent which is to be registered in place of the displayed equivalent or added to the displayed equivalent. At step 4, the dictionary editing processor 5 controls the dictionary editing block 8 and the object language analyzer 9 so that the object language analyzing dictionary 7 is searched and the results of the search are analyzed. At step 5, the dictionary editing processor 5 determines attribute information about the equivalent from the results of the search. At step 6, the determined attribute information is displayed on the display device 3 together with the equivalent under the control of the dictionary editing processor 5. If the operator wishes to modify some attribute information, the operator operates the input device 4 and inputs desired attribute information about the equivalent to the dictionary editing processor 5. At step 7, the desired attribute information about the equivalent is written into the translation dictionary 1 under the control of the translation dictionary registering block 6.

Attribute information relates to a part of speech, declension, type of word, meanings, etc. A part of speech indicates whether words are nouns, prepositions, definite articles, indefinite particles, adjectives, adverbs, verbs, etc. Declension indicates, for example, whether a noun has an intensive plural. Type of word indicate, for example, whether a noun is a countable or uncountable noun.

Figure 3:
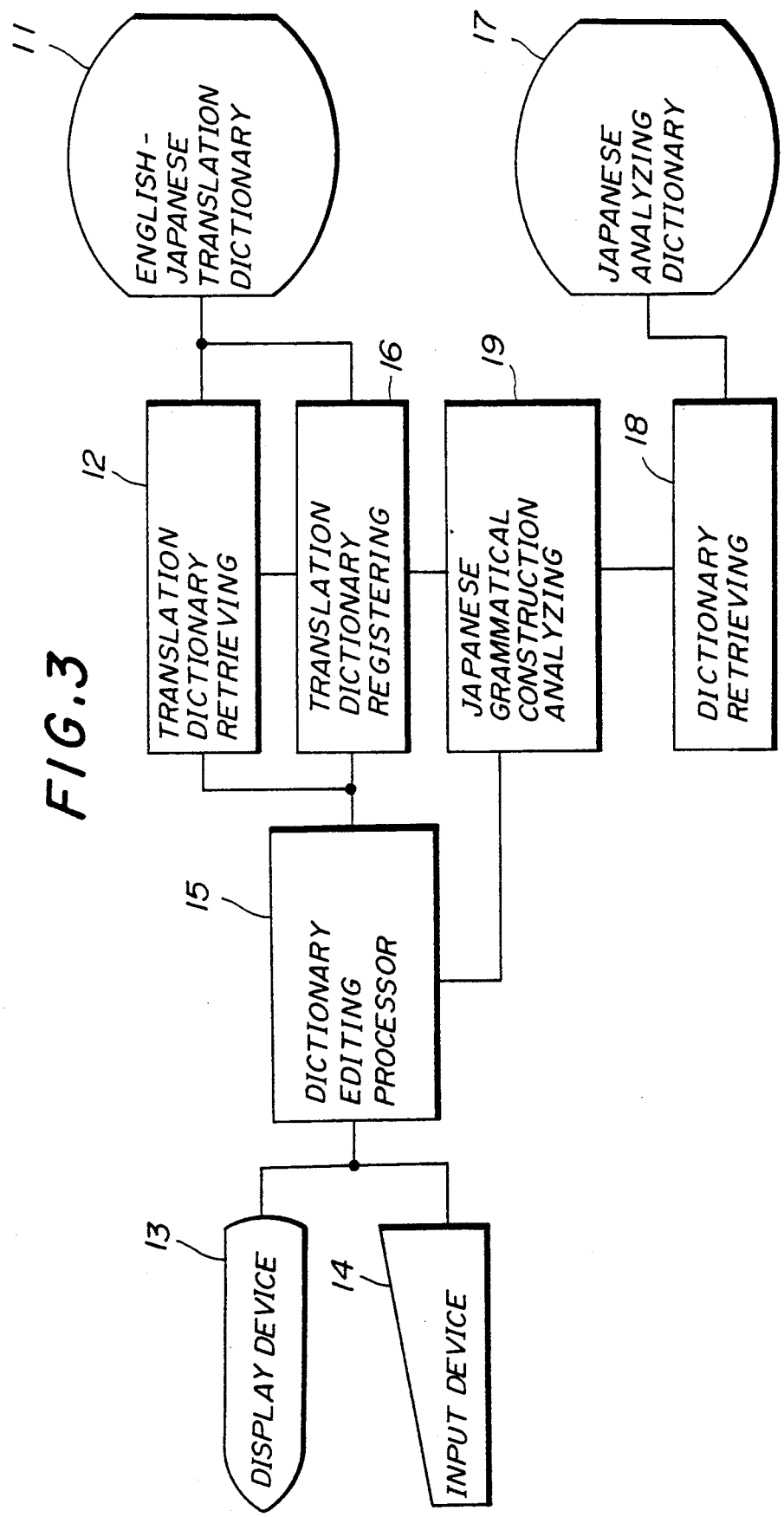
FIG. 3 is a block diagram of a dictionary editing apparatus according to a second preferred embodiment of the present invention which has a Japanese analyzing dictionary.

FIG. 3 is a block diagram of a dictionary editing apparatus according to a second preferred embodiment of the present invention, which can be incorporated in an English-Japanese translation system. The system shown in FIG. 3 is composed of an English-Japanese translation dictionary II, a translation dictionary retrieving block 12, a display device 13, an input device 14 having various keys, including ten keys, alphabetical keys and function keys, a dictionary editing processor 15, a translation dictionary registering block 16, a Japanese analyzing dictionary 17, a Japanese analyzing dictionary retrieving block 18, and a Japanese morphological element analyzer 19.

A word or phrase to be translated into Japanese is specified by a key operation on the input device 14. For example, a word or phrase itself is input to the dictionary editing processor 15 through a key operation on the input device 14. Alternatively, a word or phrase in a sentence that is displayed on the display device 13 is specified by a key operation. When the word or phrase to be translated is specified, the dictionary editing processor 15 is made active. The dictionary editing processor 15 instructs the translation dictionary retrieving block 12 to seek the specified word or phrase registered in the English-Japanese translation dictionary 11. The specified word or phrase and attribute information thereon as well as a Japanese equivalent and attribute information thereon are read out from the English-Japanese dictionary 11 and then displayed on the display device 13 under the control of the dictionary editing processor 15.

When the operator wishes to modify the displayed Japanese equivalent or add a new Japanese equivalent, the operator presses an enter key which is one of the function keys of the input device 14. Thereby, the dictionary editing processor 15 is notified of the occurrence of a request to modify the displayed Japanese equivalent or add a new Japanese equivalent. Then the dictionary editing processor 15 instructs the Japanese morphological element analyzer 19 to carry out a morphological element analysis for the equivalent by referring to the Japanese analyzing dictionary 17 so that morphological information on the equivalent is obtained. Morphological information is included in attribute information and relates to tense, person, declension, etc. A procedure for morphological element analysis executed by the Japanese morphological element analyzer 19 is realized in a conventional manner. A conventional grammatical construction analysis and/or a conventional meaning analysis may be carried out in addition to the morphological element analysis. A grammatical construction analysis is directed to analyzing the relationship between words so that a grammatical construction is determined. A meaning analysis is directed to extracting an equivalent having a correct meaning on the basis of the results of the grammatical construction analysis.

As will be described in detail later, when the present invention is applied to a Japanese-English translation system, it is necessary to carry out a grammatical construction analysis of the English word or phrase.

It is considered that in the Japanese language, morphological information (such as a part of speech and declension) and grammatical construction information (such as the detailed types of a part of speech dependent on grammatical constructions) depends on the last word in a phrase, except that, when the last word is a suffix or a series of adjuncts, the morphologic and grammatical construction information depends on an independent word followed by the last word. Thus, it can be considered that morphological information about the last word is morphological information or the entire Japanese equivalent. For the above-mentioned exception, morphological information on the independent word followed by the above-mentioned last word, such as a suffix, is determined to be morphological information on the entire Japanese equivalent.

Figure 4:
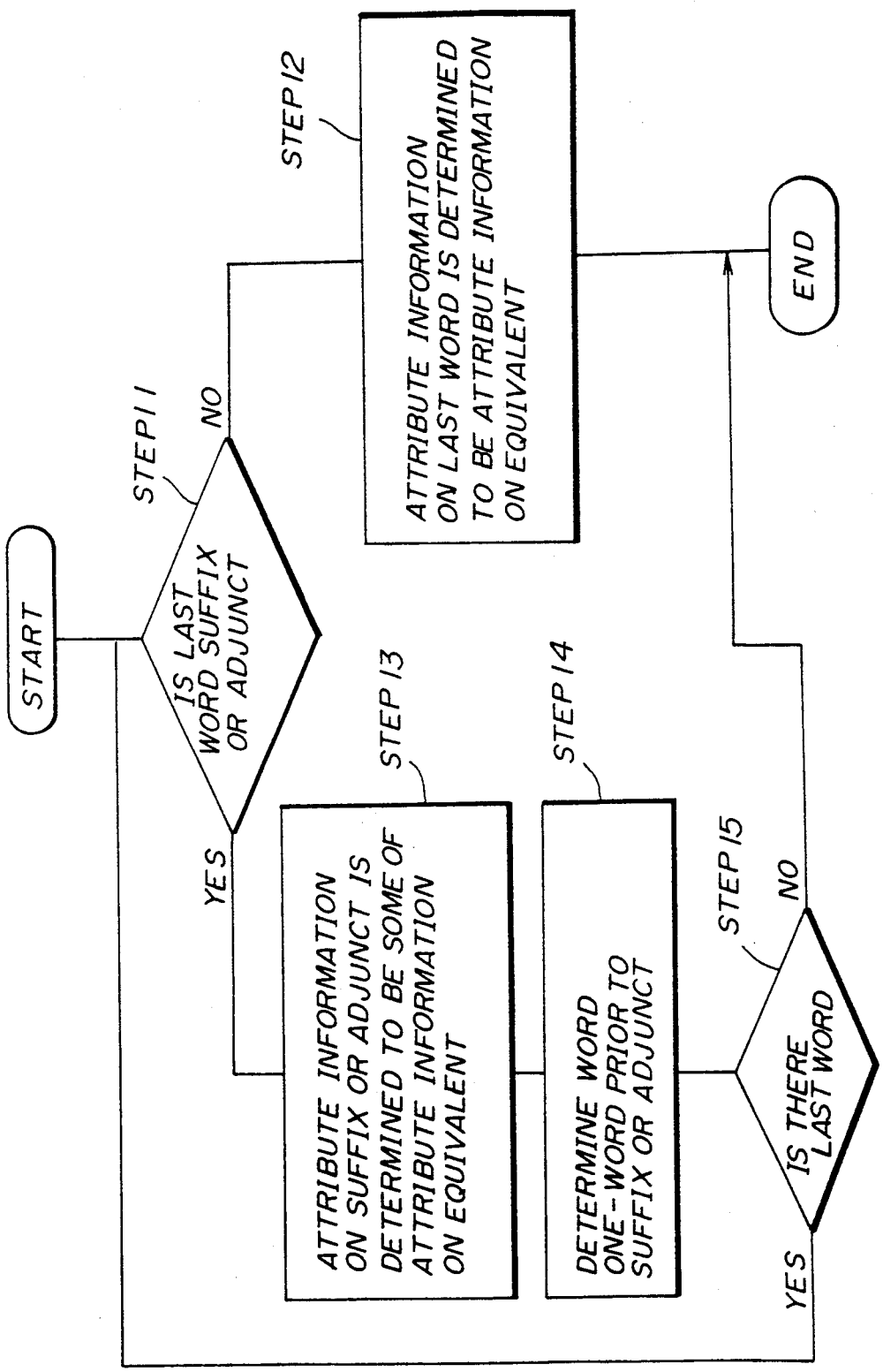
FIG. 4 is a flowchart of a procedure for determining attribute information about an input equivalent according to the second embodiment of the present invention.

Referring to FIG. 4, the dictionary editing processor 15 determines, at step 11, whether the last word of the input equivalent is a suffix or an adjunct. When the result is NO, at step 12, attribute information about the last word is presumed to be attribute information on the input equivalent. On the other hand, when the result at step 11 is YES, at step 13, attribute information on the suffix or the adjunct contained in the input equivalent is determined to be some attribute information on the input equivalent. At step 14, a word immediately prior to the suffix or adjunct is handled as the last word. At step 15, the dictionary editing processor 15 determines whether there is a last word. When the result is NO, the control ends. On the other hand, when the result at step 15 is YES, the procedure returns to step 11. When the result at step 11 is NO, attribute information on the last word which is determined at step 14 is determined to be attribute information on the input equivalent.

Information on the meanings of Japanese equivalents can be handled as in the case of morphological information. However, there is an exception. When a Japanese equivalent has a suffix at the end thereof, the meaning of the suffix is not presumed. However, it is possible that the meaning of a Japanese equivalent such as the above corresponds to a changed meaning of an independent word due to the presence of the suffix at the end thereof. In this case, it is necessary to provide a mechanism capable of presuming the meaning of the entire Japanese equivalent from information on the relationship between suffixes and changed meaning as well as information on the meaning of the independent word and changed meaning thereof. In the case where the Japanese morphological element analyzer 19 is provided with such a mechanism, it is necessary to provide the Japanese-English dictionary 17 with the above-mentioned information.

Figure 5:
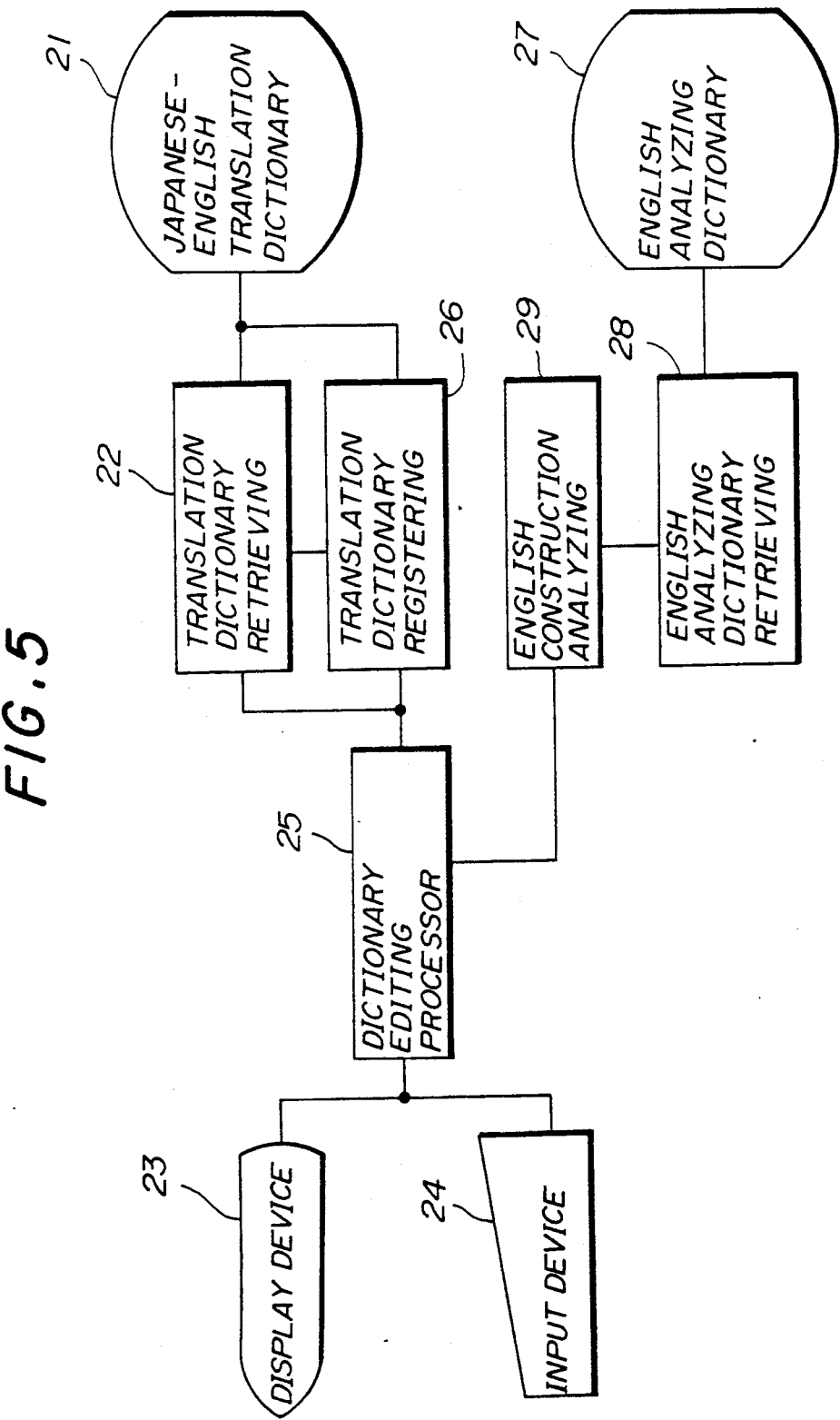
FIG. 5 is a block diagram of a dictionary editing apparatus according to a third preferred embodiment of the present invention which has an English analyzing dictionary.

A description is given of a third embodiment of the present invention applied to a Japanese-English translation system with reference to FIG. 5. The dictionary editing apparatus shown in FIG. 5 is made up of a Japanese-English translation dictionary 21 for use in translation, a translation dictionary retrieving block 22, a display, device 23, an input device 24 having a keyboard and function keys, a dictionary editing processor 25, a translation dictionary registering block 26, an English analyzing dictionary 27, an English analyzing dictionary retrieving block 28, and an English grammatical construction analyzer 29.

Figure 7:
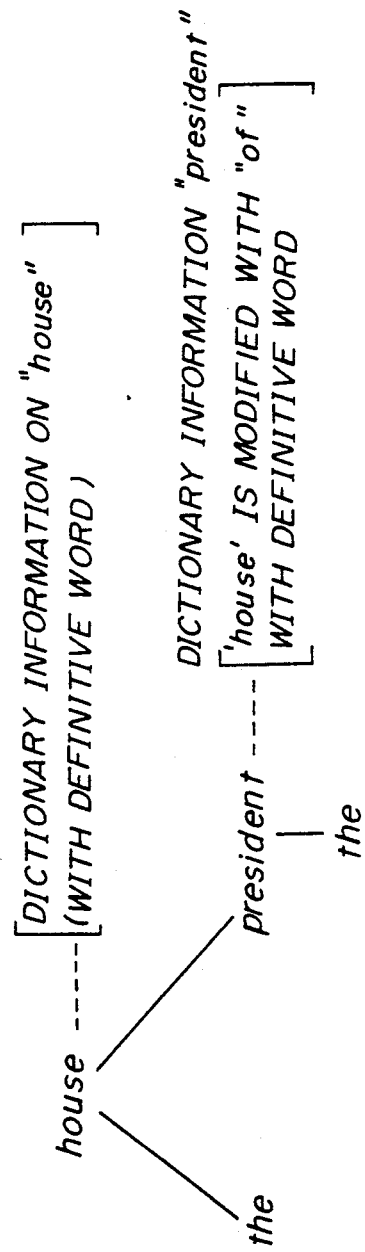
FIG. 7 is a diagram illustrating a dependence structure (tree structure) of words which is obtained by a grammatical construction analyzing process.

The English grammatical construction analyzer 29 carries out not only a conventional morphological element analysis but also a conventional grammatical construction analysis. FIG. 7 shows the results of the grammatical construction analysis. The results in FIG. 7 shows nodes such as "the" and "house", which are arranged in a conventional dependence structure (tree structure) based on rules of composition of a case. Alternatively, it is possible to form a dependence structure based on phrases or other rules. The arrangement of the nodes has a primary (parent) node. In the dependence structure, the primary node is a key node of the dependence structure ("house" in FIG. 7). Information about a word corresponding to the parent node, such as information on morphology, grammatical construction and meaning is assumed to be information on morphology, grammatical construction and meaning of the entire English equivalent. The reason for using the dependence structure is due to the fact that a primary part of the entire equivalent corresponds to the parent node. There are known various dependence structures and methods for identifying a primary part corresponding to the parent node. The English grammatical construction analyzer 29 may use an analyzing procedure due to one of the conventional dependence structures.

Figure 6:
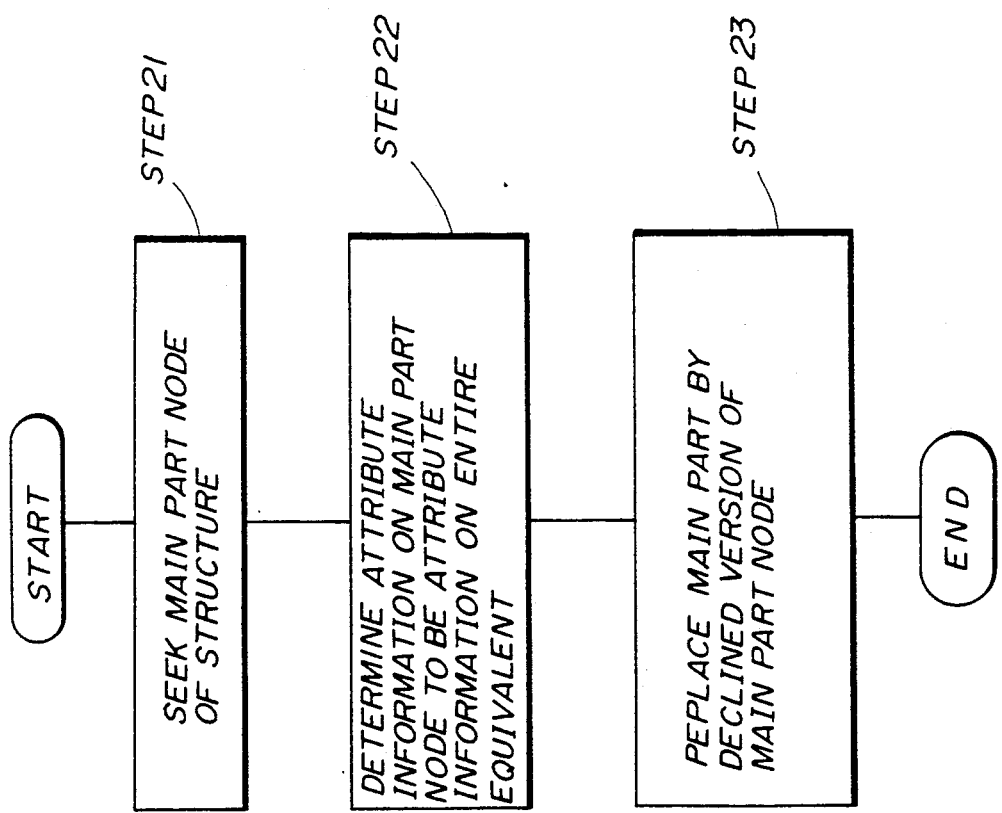
FIG. 6 is a flowchart of a procedure for determining attribute information about an input equivalent according to the third embodiment of the present invention.

FIG. 6 is a flowchart of a procedure for presuming attribute information according to the second embodiment of the present invention.

Referring to FIG. 6, at step 21, the dictionary editing processor 25 seeks the main node. In the dependence structure, the parent rode is the main node. At step 22, the dictionary editing processor 25 determines attribute information about the main node to be attribute information on the entire equivalent. At step 23, the dictionary editing processor generates a declined from of the equivalent in which the word corresponding to the main node is replaced by a declined form.

A variety of information obtained in the above-mentioned procedures is displayed, as presumed information, on the display device 23 under the control of the dictionary editing processor 25. When there is no need to modify the displayed information or add new information, the operator depresses a corresponding one of the function keys of the input device 24 and registers the displayed information in the Japanese-English translation dictionary 21. On the other hand, when the operator wishes to modify the displayed information or add new information, this modification or addition is performed, as will be described in detail later.

It is now assumed that the English word (phrase), "White House", is input to the dictionary editing apparatus shown in FIG. 3. The dictionary editing processor 15 searches the English-Japanese dictionary 11 and seeks "White House". The English-Japanese dictionary 11 stores information in the form of a table, as shown in FIG. 8. As "White House" has been stored in the English-Japanese dictionary 11, the dictionary editing processor 15 instructs the display device 13 to display "White House" and related information shown in FIG. 8. It is assumed that the operator wishes to modify a Japanese equivalent "HOWAITO HAUSU" to a new Japanese equivalent "AMERICAGASSHUKOKU NO DAITORYO NO YAKATA". The operator moves a cursor to the beginning of the Japanese equivalent "HOWAITO HAUSU" through the input device 14 and inputs the new Japanese equivalent "AMERICAGASSHUKOKU NC DAITORYO NO YAKATA" through the input device 14. When inputting of the new Japanese equivalent is completed, the operator depresses a corresponding one of the function keys so that the dictionary editing processor 15 is informed of the completion of the inputting of the new Japanese equivalent. At this time, the cursor is already positioned at the beginning of the original Japanese equivalent and thus the dictionary editing processor 15 can determine that it has been requested to change the existing Japanese equivalent to the new Japanese equivalent. The dictionary editing processor 15 sends the new Japanese equivalent to the Japanese morphological element analyzer 19, which analyzes morphological elements of the new Japanese equivalent "AMERICA-GA-SHUKOKU NO DAITORYO NO YAKATA" by referring to the Japanese analyzing dictionary 17.

The Japanese analyzing dictionary 17 stores a table as shown in FIG. 9. The Japanese morphological element analyzer 19 may be configured in a conventional manner. It can be seen from the table shown in FIG. 9 that "AMERICAGASSHUKOKU" is a proper noun (part of speech), not declinable, and the name of a place (meaning). Then the Japanese morphological element analyzer 19 determines that the attribute of the entire new Japanese equivalent is the same as that of the last word "YAKATA". As a result, it is determined that the entire new Japanese equivalent has an attribute such that it is a noun, not declinable and indicates a building/place. This attribute of the new Japanese equivalent is displayed on the display device 13 under the control of the dictionary editing processor 15. When the operator determines that the displayed attribute information is correct, the operator depresses a corresponding one of the function keys. Thereby, the dictionary editing processor 15 instructs the translation dictionary registering block 16 to register the new Japanese equivalent in the English-Japanese translation dictionary 11. As a result, the contents of the English-Japanese translation dictionary 11 are revised, as shown in FIG. 10.

When it is requested to add an alternative Japanese equivalent, the operator inputs it through the input device 14 and depresses the aforementioned key indicative of the completion of inputting a new or alternative Japanese translation. The input alternative Japanese equivalent is displayed on a predetermined equivalent addition area. The dictionary editing processor 15 determines that it is requested to add an alternative Japanese equivalent, and then sends the input alternative Japanese equivalent to the Japanese morphological element analyzer 19. Then the analyzer 19 analyzes morphological elements of the alternative Japanese equivalent by referring to the Japanese analyzing dictionary 17 through the Japanese analyzing dictionary retrieving block 18. The Japanese morphological element analysis results in attribute information on the alternative Japanese equivalent, which is displayed on the predetermined equivalent addition area under the control of the dictionary editing processor 15, as shown in FIG. 11.

It is now assumed that a Japanese word "DAITORYOFU" (corresponding to "the house of the president" in English) is input to the dictionary editing processor 25 shown in FIG. 5. It is further assumed that there is no English equivalent of the input Japanese word "DAITORYOFU" in the English-Japanese dictionary 21. The dictionary editing processor 25 instructs the translation dictionary retrieving block 22 to seek ar English equivalent of the input Japanese word in the Japanese-English translation dictionary 21. In this case, the dictionary editing processor 25 is notified that there is no English equivalent. Then the dictionary editing processor 25 controls the display device 23 to display a message which asks the operator to input an English equivalent. It is now assumed that the operator inputs the English equivalent "the house of the president"

through the keyboard of the input device 24. The dictionary editing processor 25 sends the input English equivalent to the English grammatical construction analyzer 29, which analyzes the grammatical construction of the input English equivalent.

The English analyzing dictionary 27 stores a table shown in FIG. 12. For each entry, the table has attribute information on part of speech, declension, type of word and meanings. The grammatical construction analysis results in a dependence structure of words, as shown in FIG. 7. As described previously, the parent node of the dependence structure shown in FIG. 7 is "house". Thus, the English grammatical construction analyzer 29 determines that attribute information on the parent node is attribute information on the entire English equivalent "the house of the president". That is, the input English equivalent is determined as follows.

Part of speech: noun;
Declension: houses (plural form; the houses of the president);
Type of word: countable noun;
Additional information on grammatical structure: noun with a definite article; and
Meaning: building or place. This information is displayed on the display device 23 under the control of the dictionary editing processor 25, as shown in FIG. 13.

According to the present invention, a new equivalent is analyzed using an objective language dictionary so that attribute information about the new equivalent is presumed. As a result, it is possible for the operator to save trouble considerably. In addition, attribute information on equivalent language is determined at higher speeds since the analysis of an equivalent is carried out due to the fact that attributes of many words or phrases depend on the last word. Further, attribute information on equivalents is presumed more accurately, taking into consideration a suffix or an adjunct. When the grammatical construction is employed in addition to the morphological element analysis, attribute information on equivalents can be presumed more precisely. Moreover, when a main part of an equivalent is identified on the basis of the results of the grammatical construction analysis, attribute information can be presumed more precisely. When the dependent structure is employed, the relationship between structural elements in an equivalent can be obtained precisely at high speeds, so that attribute information can be obtained precisely.

Figure 14:
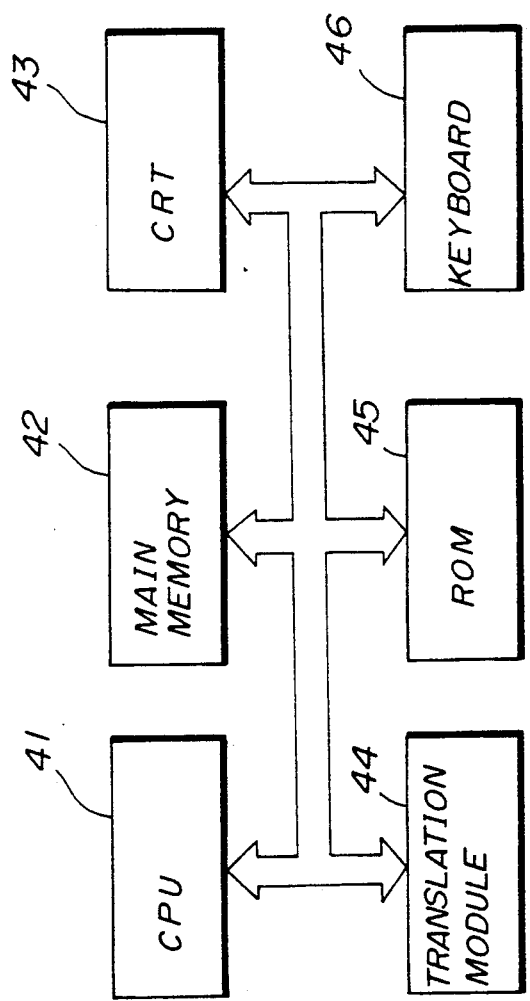
FIG. 14 is a diagram illustrating the modified contents of the Japanese-English translation dictionary shown in FIG. 5.

FIG. 14 is a block diagram of a hardware structure of the aforementioned embodiment of the present invention. The hardware structure in FIG. 14 is made up of a central processing unit (CPU) 41, a main memory 42, a cathode-ray tube (CRT) device 43, a translation module 44, a read only memory (ROM) 45 and a keyboard 46. The ROM 45 stores programs of the aforementioned procedures as shown in FIGS. 2 and 6 and programs to be executed by the translation module 44. The programs of the procedures as shown in FIGS. 2 AND 6 are executed by the CPU 41. That is, the CPU 41 realizes the aforementioned dictionary editing processor 5, translation dictionary retrieving block 2, translation dictionary registering block 6, object language analyzing dictionary retrieving block 8 and object language analyzer 9. The main memory 45 realizes the translation dictionary 1 and the object language analyzing dictionary 7. Further, the main memory 45 is used for storing various data. The CRT device 43 and the keyboard 46 correspond to the display device 3 and the input device 4, respectively. The translation module 44 translates the original language into the object language, and can be formed by a conventional manner such as a structure disclosed in Japanese Laid-Open Patent Application No. 63-136265. Alternatively, it is possible to provide the CPU 41 with the function of the translation module 44. It is also possible to provide the dictionary editing processor 5 separately from the CPU 41.

The present invention is not limited to the specifically described embodiments, and variations and modifications may be made without departing from the scope of the present invention.

What is claimed is:

1. An apparatus for editing a dictionary for use in translation comprising:
    a translation dictionary having words and phrases in an original language and having equivalents in an object language for said words and phrases in the original language and attribute information on said equivalents;
    first retrieving means, coupled to said translation dictionary, for retrieving one of said words and phrases in said translation dictionary and for outputting data related to said one of the words and phrases in the original language;
    input means, for inputting data including a desired equivalent in the object language to be added to or substituted for a corresponding one of said words and phrases in the translation dictionary;
    an object language dictionary storing words in the object language and attribute information on said words;
    analyzing means, coupled to said input means and said object language dictionary, for analyzing said desired equivalent supplied from said input means by referring to said words in the object language and said attribute information on said words stored in said object language dictionary and for determining attribute information on said desired equivalent; and
    registering means, coupled to said translation dictionary and said analyzing means, for registering said desired equivalent and said attribute information on said desired equivalent supplied from said analyzing means in said translation dictionary.

2. An apparatus as claimed in claim 1, further comprising display means, coupled to said analyzing means, for displaying said desired equivalent and said attribute information on said desired equivalent from said analyzing means.

3. An apparatus as claimed in claim 1, wherein said input means includes a key for generating an instruction signal when it is determined that said attribute information on said desired equivalent presumed by said analyzing means is correct, and said registering means starts to register said desired equivalent and said attribute information on said desired equivalent when said instruction signal is generated.

4. An apparatus as claimed in claim 1, wherein said data input by said input means includes correction data which is substituted for some of said attribute information on said desired equivalent, and said registering means registers said correction data in said translation dictionary in place of said some of the attribute information.

5. An apparatus as claimed in claim 1, wherein said analyzing means includes morphological element analyzing means for analyzing morphological elements of said desired equivalent and for presuming said attribute information on said desired equivalent on the basis of said morphological elements.

6. An apparatus as claimed in claim 5, wherein said morphological element analyzing means comprises:
first means for determining whether a last word among said words of said desired equivalent is a suffix or an adjunct;
second means, coupled to said first means, for determining attribute information about said last word to be attribute information on said desired equivalent when it is determined that said last word is not a suffix nor an adjunct;
third means, coupled to said first means, for determining attribute information about one of said words of said desired equivalent preceding said last word thereof to be attribute information on said desired equivalent when it is determined that said last word is a suffix or an adjunct.

7. An apparatus as claimed in claim 1, wherein said analyzing means includes grammatical construction analyzing means for analyzing a grammatical construction of said desired equivalent and for presuming said attribute information on said desired equivalent on the basis of said morphological elements.

8. An apparatus as claimed in claim 7, wherein said grammatical construction analyzing means comprises:
first means for identifying one of said words of said desired equivalent which forms a main part of said desired equivalent in terms of grammatical construction; and
second means for determining attribute information about said one of the words of the equivalent to be attribute information on said desired equivalent.

9. An apparatus as claimed in claim 8, wherein sad first means comprises means for generating a grammatical construction based tree structure of the words of said desired equivalent and outputting, as said one of the words of said desired equivalent which forms a main part of said desired equivalent in terms of grammatical construction, a word from which said grammatical construction based tree structure starts.

10. An apparatus as claimed in claim 1, wherein said original language is Japanese and said object language is English or vice versa.

11. A method for editing a translation dictionary for use in translation, said translation dictionary having words and phrases in an original language and having equivalents in an object language for said words and phrases in the original language and attribute information on said equivalents, comprising the steps of:
(a) retrieving one of said words and phrases in said translation dictionary and outputting data related to said one of the words and phrases in the original language;
(b) inputting data including a desired equivalent in the object language to be added to or substituted for a corresponding one of said words and phrases in the translation dictionary;
(c) analyzing said desired equivalent by referring to words in the object language and attribute information on said words stored in an object language dictionary and determining attribute information on said desired equivalent; and
(d) registering said desired equivalent and said attribute information on said desired equivalent in said translation dictionary.

12. A method as claimed in claim 11, further comprising the step of displaying said desired equivalent and said attribute information on said desired equivalent.

13. A method as claimed in claim 11, further comprising the step of generating an instruction signal when it is determined that said attribute information on said desired equivalent is correct, wherein said step (d) starts to register said desired equivalent and said attribute information on said desired equivalent when said instruction signal is generated.

14. A method as claimed in claim 11, further comprising the step of inputting correction data which is substituted for some of said attribute information on said desired equivalent, wherein said step (d) registers said correction data in said translation dictionary in place of said some of the attribute information.

15. A method as claimed in claim 11, said step (c) comprises the steps of:
(c-1) analyzing morphological elements of said desired equivalent and;
(c-2) determining said attribute information on desired equivalent on the basis of said morphological elements.

16. A method as claimed in claim 15, wherein said step (c-1) comprises the steps of:
determining whether a last word among said words of said desired equivalent is a suffix or an adjunct;
determining attribute information about said word to be attribute information on said desired equivalent when it is determined that said last word is neither a suffix nor an adjunct;
determining attribute information about one of words of said desired equivalent preceding said word thereof to be attribute information on said equivalent when it is determined that said word is a suffix or an adjunct.

17. A method as claimed in claim 11, said step (c) comprises the step of analyzing the grammatical the construction of said desired equivalent and presuming said attribute information on said desired equivalent on the basis of said morphological elements.

18. A method as claimed in claim 17, wherein said step of analyzing the grammatical construction of said desired equivalent comprises the steps of:
identifying one of said words of said desired equivalent which forms a main part of said desired equivalent in terms of grammatical construction; and
determining attribute information about said of the words of the equivalent to be attribute information on said desired equivalent.

19. A method as claimed in claim 18, wherein said step of identifying one of said words of said desired equivalent comprises the steps of:
generating a grammatical construction based tree structure of the words of said desired equivalent and;
outputting, as said one of the words of said desired equivalent which forms a main part of said desired equivalent in terms of grammatical construction, a word from which said grammatical construction based tree structure starts.

20. A method as claimed in claim 11, wherein said original language is Japanese and said language is English or vice versa.

* * * * *